United States Patent
Fox

(10) Patent No.: US 10,687,107 B2
(45) Date of Patent: *Jun. 16, 2020

(54) PREMISES MONITORING SYSTEM

(71) Applicant: Applied Capital, Inc., Albuquerque, NM (US)

(72) Inventor: Rodney W. Fox, Couer d'Alene, ID (US)

(73) Assignee: Applied Capital, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,350

(22) Filed: Mar. 29, 2019

(65) Prior Publication Data

US 2019/0230402 A1 Jul. 25, 2019

Related U.S. Application Data

(63) Continuation of application No. 15/642,043, filed on Jul. 5, 2017, now Pat. No. 10,313,732, which is a (Continued)

(51) Int. Cl.
*G08B 23/00* (2006.01)
*G08B 25/00* (2006.01)
(Continued)

(52) U.S. Cl.
CPC ....... *H04N 21/4227* (2013.01); *G08B 25/006* (2013.01); *G08B 25/009* (2013.01); *G08C 19/00* (2013.01); *H04N 21/2407* (2013.01); *H04N 21/41* (2013.01); *H04N 21/4108* (2013.01); *H04N 21/4113* (2013.01);
(Continued)

(58) Field of Classification Search
CPC .. G08B 25/006; G08B 25/009; G08B 25/001; H04M 11/04; H04W 24/00; G06K 9/00771; G06K 2009/00738; G06T 2207/10016
USPC ...... 340/539.1, 531, 506, 539, 5.64, 539.18, 340/505, 7.58, 7.52, 10.1, 425.5, 904, 340/540, 541; 455/412.1, 412.2, 404.1, 455/521, 403, 550, 426, 422; 379/37–40, 379/45–47, 49; 370/310, 338, 310.2, 312, 370/313, 328, 400, 401
See application file for complete search history.

(56) References Cited

U.S. PATENT DOCUMENTS 6,229,429 B1    5/2001  Horon
6,369,695 B1    4/2002  Horon
(Continued)

*Primary Examiner* — Mirza F Alam
(74) *Attorney, Agent, or Firm* — Wilcox & Myers, P.C.; Jeffrey D. Myers

(57) ABSTRACT

This invention relates generally to computer systems, and more specifically, to a premise monitoring system. In one embodiment, the invention includes operations of receiving one or more signals containing a device identifier and a device condition from one or more remote alarm monitoring systems; retrieving enhanced information based on the device identifier and/or the device condition; determining one or more communication methods and/or communication destinations based on the device identifier and/or the device condition; and dispatching the enhanced information to the one or more communication destinations using the one or more communication methods.

19 Claims, 10 Drawing Sheets

Related U.S. Application Data continuation of application No. 13/767,580, filed on Feb. 14, 2013, now Pat. No. 9,728,082, which is a continuation of application No. 12/695,373, filed on Jan. 28, 2010, now Pat. No. 8,378,817.

(60) Provisional application No. 61/228,044, filed on Jul. 23, 2009, provisional application No. 61/147,948, filed on Jan. 28, 2009.

(51) Int. Cl.

| | | |
|---|---|---|
| *H04N 21/4227* | (2011.01) | |
| *G08C 19/00* | (2006.01) | |
| *H04N 21/24* | (2011.01) | |
| *H04N 21/41* | (2011.01) | |
| *H04N 21/4147* | (2011.01) | |
| *H04N 21/434* | (2011.01) | |
| *H04N 21/6334* | (2011.01) | |
| *H04W 12/08* | (2009.01) | |
| *G06F 21/44* | (2013.01) | |
| *H04L 29/08* | (2006.01) | |
| *H04N 5/44* | (2011.01) | |
| *H04W 12/06* | (2009.01) | |

(52) U.S. Cl.
CPC ..... *H04N 21/4126* (2013.01); *H04N 21/4147* (2013.01); *H04N 21/434* (2013.01); *H04N 21/6334* (2013.01); *H04W 12/08* (2013.01); *G06F 21/445* (2013.01); *G06F 2221/2115* (2013.01); *G06F 2221/2129* (2013.01); *G08B 23/00* (2013.01); *G08C 2201/40* (2013.01); *G08C 2201/41* (2013.01); *G08C 2201/42* (2013.01); *G08C 2201/93* (2013.01); *H04L 67/125* (2013.01); *H04N 2005/4425* (2013.01); *H04W 12/06* (2013.01)

(56) References Cited

U.S. PATENT DOCUMENTS

| | | | | |
|---|---|---|---|---|
| 2005/0190055 | A1* | 9/2005 | Petite | G01V 1/364 340/531 |
| 2008/0048861 | A1* | 2/2008 | Naidoo | G08B 13/19669 340/541 |
| 2008/0088439 | A1* | 4/2008 | Mehaffey | G08B 25/009 340/539.18 |
| 2008/0258913 | A1* | 10/2008 | Busey | G08B 21/0415 340/540 |
| 2009/0022362 | A1* | 1/2009 | Gagvani | G08B 13/19615 382/100 |

* cited by examiner

PREMISES MONITORING SYSTEM

CROSS-REFERENCE TO RELATED APPLICATIONS

This application is a continuation application of U.S. patent application Ser. No. 15/642,043, entitled "Premises Monitoring System", filed on Jul. 5, 2017, which is a continuation application of U.S. patent application Ser. No. 13/767,580, entitled "Premises Monitoring System", filed on Feb. 14, 2013, and issued as U.S. Pat. No. 9,728,082 on Aug. 8, 2017, which is a continuation application of U.S. patent application Ser. No. 12/695,373, entitled "Premises Monitoring System", filed on Jan. 28, 2010, and issued as U.S. Pat. No. 8,378,817 on Feb. 19, 2013, which claims priority to and the benefit of U.S. Provisional Application No. 61/147,948, entitled "Premises Monitoring System", filed Jan. 28, 2009, and U.S. Provisional Application No. 61/228,044, entitled "Premises Monitoring System", filed Jul. 23, 2009, and the specifications and claims thereof are incorporated herein by reference.

FIELD OF THE INVENTION

This invention relates generally to computer systems, and more specifically, to a premise monitoring system.

SUMMARY

This invention relates generally to computer systems, and more specifically, to a premise monitoring system. In one embodiment, the invention includes operations of receiving one or more signals containing a device identifier and a device condition from one or more remote alarm monitoring systems; retrieving enhanced information based on the device identifier and/or the device condition; determining one or more communication methods and/or communication destinations based on the device identifier and/or the device condition; and dispatching the enhanced information to the one or more communication destinations using the one or more communication methods.

BRIEF DESCRIPTION OF THE DRAWINGS

Embodiments of the present invention are described in detail below with reference to the following drawings.

DETAILED DESCRIPTION

This invention relates generally to computer systems, and more specifically, to a premises monitoring system. Specific details of certain embodiments of the invention are set forth in the following description and in FIGS. 1-10 and in APPENDIX A to U.S. patent application Ser. No. 12/695,373 to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
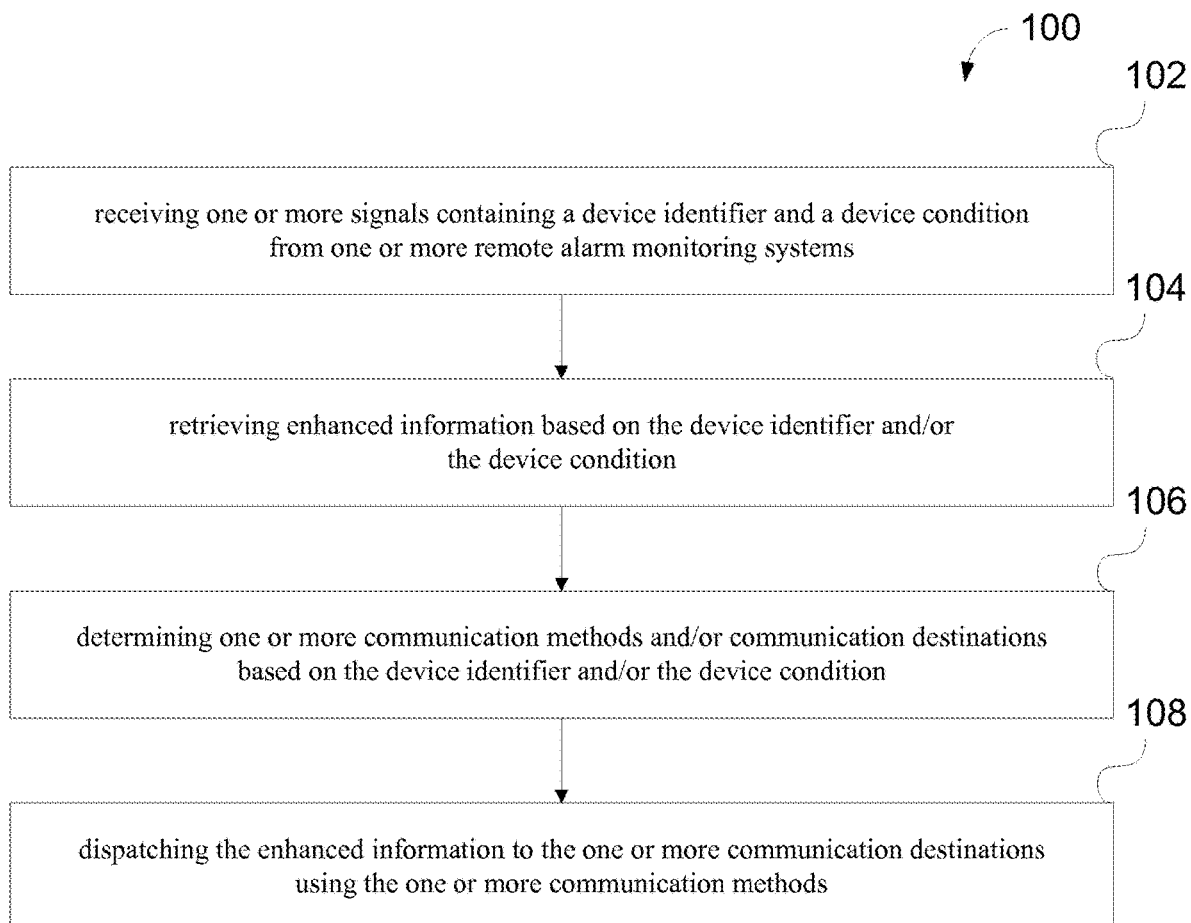
FIG. 1 is a block diagram of a method performed by a premises monitoring system, in accordance with an embodiment of the invention.

FIG. 1 is a block diagram of a method performed by a premises monitoring system, in accordance with an embodiment of the invention. In some embodiments, method 100 may include operations of receiving one or more signals containing a device identifier and a device condition from one or more remote alarm monitoring systems at block 102; retrieving enhanced information based on the device identifier and/or the device condition at block 104; determining one or more communication methods and/or communication destinations based on the device identifier and/or the device condition at block 106; and dispatching the enhanced information to the one or more communication destinations using the one or more communication methods at block 108.

Figure 10:
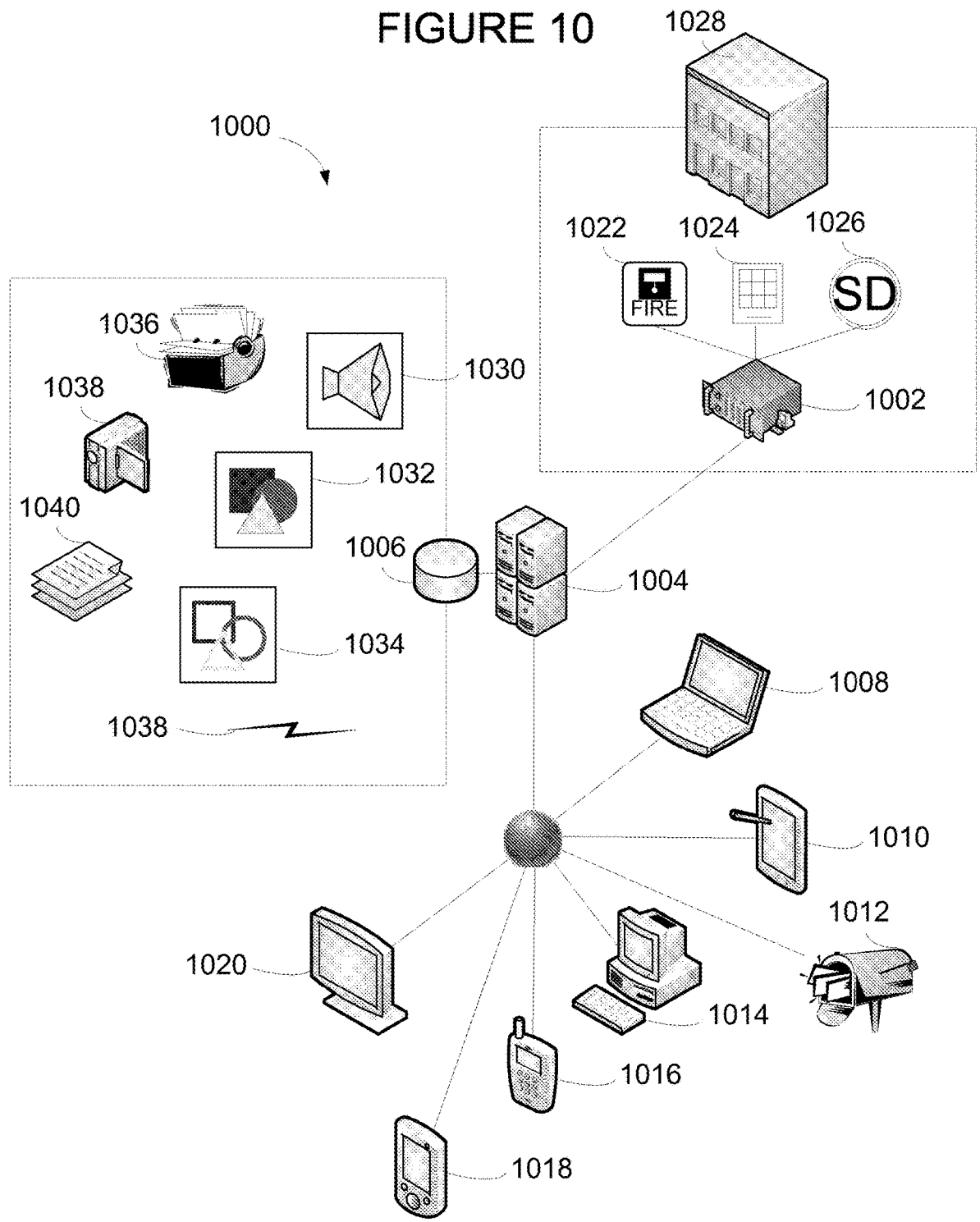
FIG. 10 is a diagram of a system for implementing a premises monitoring system, in accordance with an embodiment of the invention; and APPENDIX A to U.S. patent application Ser. No. 12/695,373 includes details of various embodiments of the invention.

In some embodiments, method 100 may be performed by a premises monitoring system 1004 as disclosed in FIG. 10. For example, in some embodiments, method 100 may be used to supplement an existing monitoring system by providing enhanced information to more destinations in a timelier manner without requiring disruption to an existing monitoring system. A remote alarm monitoring system 1002 may be programmed to send one or more signals containing one or more device identifiers and one or more device conditions to a premises monitoring system 1004. The premises monitoring system 1004 may receive the one or more signals containing one or more device identifiers and one or more device conditions and retrieve enhanced information based on the same (or some other criteria) from one or more data stores 1006. The premises monitoring system 1004 may determine one or more communication methods and one or more communication destinations from the one or more data stores 1006 also based on the one or more device identifiers and/or the one or more device conditions (or some other criteria). The premises monitoring system 1004 may dispatch the enhanced information to the one or more communication destinations using the one or more communication methods, such as by dispatching the enhanced information to one or more laptops 1008, one or more tablets 1010, one or more mail boxes 1012, one or more computers 1014, one or more phones 1016, one or more personal digital assistants 1018, and/or one or more displays 1020.

As a further specific example, in some embodiments, a remote alarm monitoring system 1002 may be programmed to send a signal containing a device identifier for a particular fire alarm and a device condition of alarm to a premises monitoring system 1004. The premises monitoring system 1004 may receive the signal containing a device identifier for a particular fire alarm device and a device condition of alarm and retrieve enhanced information from a data store 1006 based on the same of a floor plan highlighting the particular fire alarm device, showing access paths and stairwells related to the particular fire alarm device, and highlighting hazard areas relating to the particular fire alarm device well as passcodes, contact information, and a picture of an onsite manager. The premises monitoring system 1004 may determine a communication method of email and a communication destination of a first responder from the data store 1006 also based on the particular fire alarm device and the device condition of alarm. The premises monitoring system 1004 may dispatch the enhanced information to the first responder via email. The premises monitoring system 1004 may retrieve different enhanced information from a data store 1006 for a different device identifier and/or a different device condition. Similarly, the premises monitoring system 1004 may determine a different communication method and/or communication destination for a different device identifier and/or a different device condition.

Figure 2:
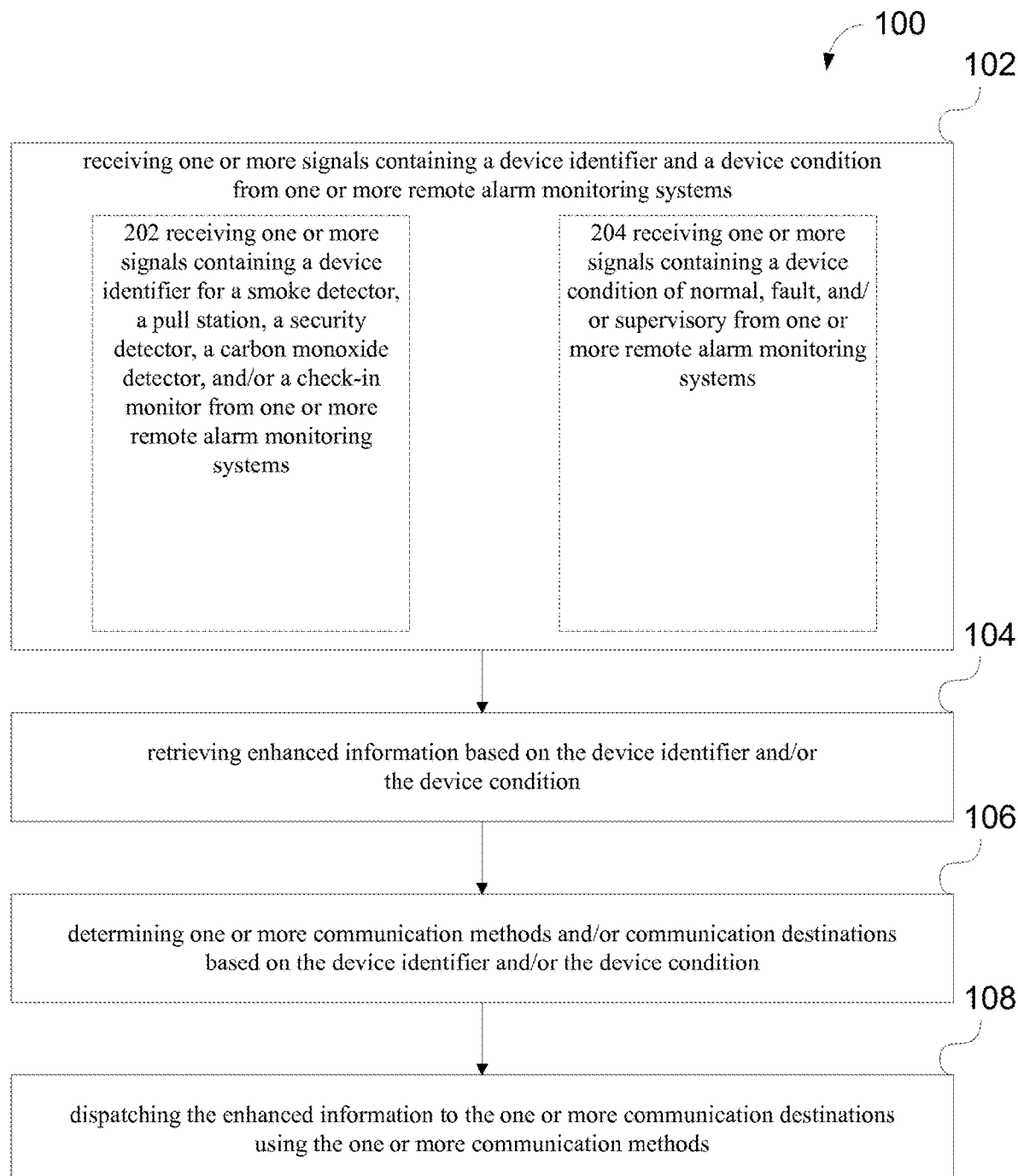
FIGS. 2-7 are block diagrams of alternative embodiments of a method performed by a premises monitoring system, in accordance with embodiments of the invention.

FIG. 2 is a block diagram of alternative embodiments of a method performed by a premises monitoring system, in accordance with embodiments of the invention. In some embodiments, method 100 may include operations of receiving one or more signals containing a device identifier for a smoke detector, a pull station, a security detector, a carbon monoxide detector, and/or a check-in monitor from one or more remote alarm monitoring systems at block 202 and/or receiving one or more signals containing a device condition of normal, fault, and/or supervisory from one or more remote alarm monitoring systems at block 204.

In some embodiments, the operation of receiving one or more signals containing a device identifier for a smoke detector, a pull station, a security detector, a carbon monoxide detector, and/or a check-in monitor from one or more remote alarm monitoring systems at block 202 may be performed by a premises monitoring system 1004 as disclosed in FIG. 10. For example, in some embodiments, a premises monitoring system 1004 may receive one or more signals from a remote alarm monitoring system 1002 containing one or more device identifiers for a smoke detector 1026, a pull station 1022, a security detector 1024, a carbon monoxide detector (not illustrated), and/or a check-in monitor (not illustrated) associated with one or more premises 1028. In some embodiments, a premises monitoring system 1004 may receive one or more signals from one or more remote alarm monitoring systems 1002 containing device identifiers for a plurality of detectors and/or monitors. In some embodiments, a premises monitoring system 1004 may receive one or more signals from one or more remote alarm monitoring systems 1002 containing device identifiers for one or more other similar detectors and/or monitors.

In some embodiments, the operation of receiving one or more signals containing a device condition of normal, fault, and/or supervisory from one or more remote alarm monitoring systems may be performed by a premises monitoring system 1004 as disclosed in FIG. 10. For example, in some embodiments, one or more premises monitoring systems 1004 may receive a signal from one or more remote alarm monitoring systems 1002 containing one or more device conditions of normal, fault, and/or supervisory for one or more smoke detectors 1026, pull stations 1022, security detectors 1024, carbon monoxide detectors (not illustrated), and/or check-in monitors (not illustrated) associated with one or more premises 1028. A normal condition may indicate normal operation of a detector and/or a monitor. A fault condition may indicate a triggering event, such as smoke at a smoke detector 1026, manual activation of a pull station 1022, breach of a security detector 1024, carbon monoxide of a carbon monoxide detector, and/or failure to check-in at an expected time of a check-in monitor (e.g. relating to safety of elderly individuals or children). In some embodiments, a premises monitoring system 1004 may receive one or more signals from one or more remote alarm monitoring systems 1002 containing device conditions for a plurality of detectors and/or monitors. In some embodiments, one or more premises monitoring systems 1004 may receive one or more signals from one or more remote alarm monitoring systems 1002 containing device conditions for one or more other detectors and/or monitors. In some embodiments, one or more premises monitoring systems 1004 may receive one or more signals from one or more remote alarm monitoring systems 1002 containing one or more different device conditions such as a test condition.

Figure 3:
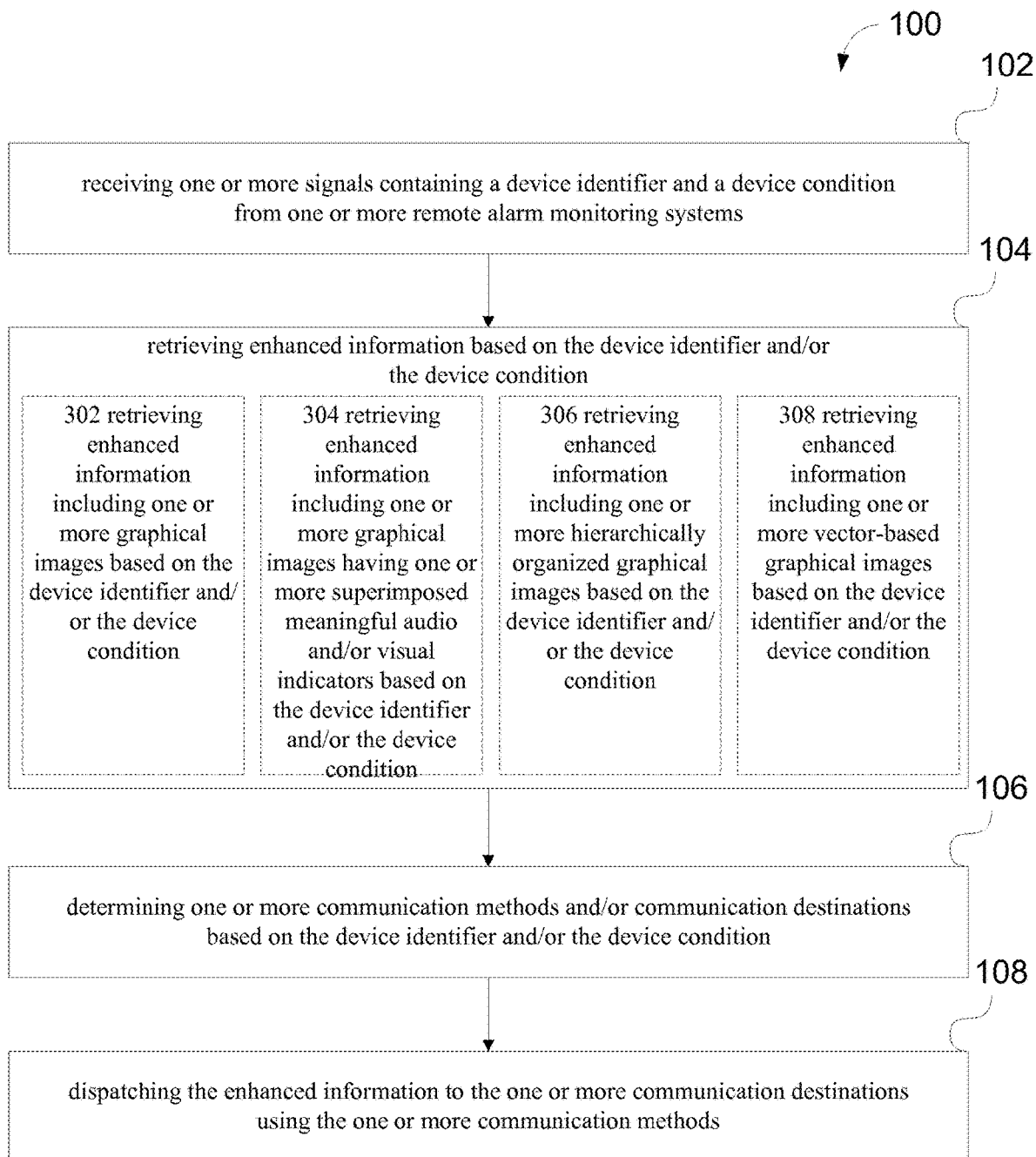

FIG. 3 is a block diagram of alternative embodiments of a method performed by a premises monitoring system, in accordance with embodiments of the invention. In some embodiments, method 100 may include operations of retrieving enhanced information including one or more graphical images based on the device identifier and/or the device condition at block 302; retrieving enhanced information including one or more graphical images having one or more superimposed meaningful audio and/or visual indicators based on the device identifier and/or the device condition at block 304; retrieving enhanced information including one or more hierarchically organized graphical images based on the device identifier and/or the device condition at block 306; and/or retrieving enhanced information including one or more vector-based graphical images based on the device identifier and/or the device condition at block 308.

In some embodiments, the operation of retrieving enhanced information including one or more graphical images based on the device identifier and/or the device condition at block 302 may be performed by a premises monitoring system 1004 as disclosed in FIG. 10. For example, in some embodiments, one or more premises monitoring systems 1004 may retrieve enhanced information including one or more graphical images 1032/1034 based on one or more device identifiers and/or one or more device conditions from one or more data sources 1006. In some embodiments, one or more premises monitoring systems 1004 may retrieve enhanced information including one or more graphical images 1032/1034, such as a map, a picture, a video 1038, a floor plan, a site plan, a personnel photo, a camera feed 1038, a heat sensor image, a sound sensor image, and/or a movement sensor image, based on one or more device identifiers and/or one or more device conditions from a data source 1006. A map may include a map to or of premises 1028. A picture may include a real-time or previously taken picture of or within premises 1028. A video 1038 may include a real-time or previously recorded video of or within premises 1028. A floor plan may include a floor plan or as-built drawings of premises 1028. A site plan may include a site plan of premises 1028 and may include surrounding premises. A personnel photo may include a photograph of an owner, manager, employee, customer, supplier, or neighbor of premises 1028. A camera feed 1038 may include a real-time or previously taken camera feed of a camera of premises 1028. A heat sensor image may include a real-time or previously taken image illustrating heat positions within premises 1028. A sound sensor image may include a real-time or previously taken image illustrating sound (e.g. voice) positions within premises 1028. A movement sensor image may include a real-time or previously taken image illustrating movement positions within premises 1028. In some embodiments, one or more premises monitoring systems 1004 may retrieve enhanced information including one or more other graphical images 1032/1034 based on one or more device identifiers and/or one or more device conditions from a data source 1006. In some embodiments, one or more premises monitoring systems 1004 may retrieve enhanced information including one or more graphical images 1032/1034 based on one or more device identifiers and/or one or more device conditions from a source other than one or more data sources 1006, such as from a camera or video camera of premises 1028, a computer of premises 1028, a laptop 1008, a tablet 1010, a computer 1024, a phone 1016, a personal digital assistant 1018, and/or remote or independent data source.

In some embodiments, the operation of retrieving enhanced information including one or more graphical images having one or more superimposed meaningful audio and/or visual indicators based on the device identifier and/or the device condition at block 304 may be performed by a premises monitoring system 1004 as disclosed in FIG. 10. For example, in some embodiments, one or more premises monitoring systems 1004 may retrieve enhanced information including one or more graphical images 1032/1034 having one or more superimposed meaningful audio and/or visual indicators based on one or more device identifiers and/or one or more device conditions from one or more data sources 1006. A superimposed meaningful audio and/or visual indicator may include one or more icons or one or more designators superimposed on a map, picture, floor plan, and/or site plan to illustrate or instruct regarding device type, device position, condition type, hazardous material position, emergency exit position, stairwell position, pathway position, handicap safe area, extinguisher position, hydrant position, stand pipe position, utility disconnect position, and/or the like. A superimposed meaningful audio and/or visual indicator may be customizable, blinkable, and/or color-codable. As a specific example, in some embodiments, one or more premises monitoring systems 1004 may retrieve enhanced information from one or more data stores 302 including a floor plan having a superimposed icon illustrating device type and device position relative to the floor plan and superimposed indicators highlighting pathways, stairwells, hazardous material positions, and utility disconnects, all of which may be tailored to the device identifier and/or the device condition. In some embodiments, one or more premises monitoring systems 1004 may retrieve enhanced information including one or more graphical images 1032/1034 having one or more superimposed meaningful audio and/or visual indicators based on one or more device identifiers and/or one or more device conditions from one or more data sources 1006 using input provided by one or more laptops 1008, tablets 1010, computers 1024, phones 1016, and/or personal digital assistants 1018 (e.g. a first responder at premises 1028 providing input regarding a collapsed and unusable stairwell).

In some embodiments, the operation of retrieving enhanced information including one or more hierarchically organized graphical images based on the device identifier and/or the device condition at block 306 may be performed by a premises monitoring system 1004 as disclosed in FIG. 10. For example, in some embodiments, one or more premises monitoring systems 1004 may retrieve enhanced information including one or more hierarchically organized graphical images 1032/1034 based on one or more device identifiers and/or one or more device conditions from one or more data sources 1006. A hierarchically organized graphical image may include any group of graphical images arranged relative to one another and/or accessible through one another. As a specific example, in some embodiments, a hierarchically organized graphical image may include a camera feed from a room of a device accessible from a floor plan accessible from a site plan accessible from a map.

In some embodiments, the operation of retrieving enhanced information including one or more vector-based graphical images based on the device identifier and/or the device condition at block 308 may be performed by a premises monitoring system 1004 as disclosed in FIG. 10. For example, in some embodiments, one or more premises monitoring systems 1004 may retrieve enhanced information including one or more vector-based graphical images 1034 based on one or more device identifiers and/or one or more device conditions from one or more data sources 1006. In some embodiments, one or more premises monitoring systems 1004 may retrieve enhanced information including one or more vector-based graphical images 1034 allowing magnification without degradation (e.g. to approximately 6600%) based on one or more device identifiers and/or one or more device conditions. In some embodiments, one or more premises monitoring systems 1004 may retrieve enhanced information including one or more raster-based graphical images 1032 based on one or more device identifiers and/or one or more device conditions. In some embodiments, one or more premises monitoring systems 1004 may retrieve enhanced information including one or more .BMP, .RLE, .GIF, .JPG, .JPEG, .PDF, .WMF, .EMF, .CAD graphical images 1032/1034 based on one or more device identifiers and/or one or more device conditions.

Figure 4:
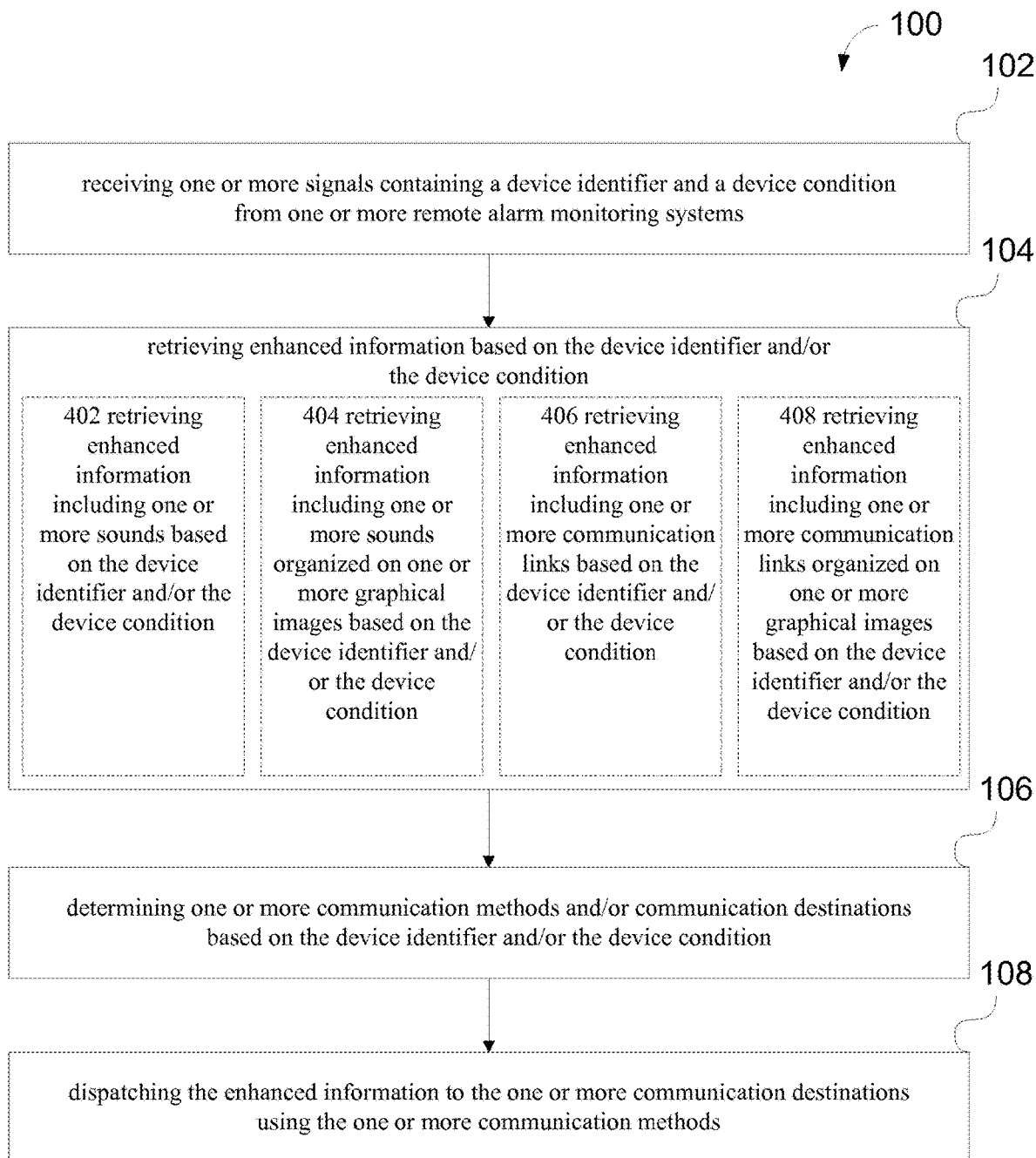

FIG. 4 is a block diagram of alternative embodiments of a method performed by a premises monitoring system, in accordance with embodiments of the invention. In some embodiments, method 100 may include operations of retrieving enhanced information including one or more sounds based on the device identifier and/or the device condition at block 402, retrieving enhanced information including one or more sounds organized on one or more graphical images based on the device identifier and/or the device condition at block 404, retrieving enhanced information including one or more communication links based on the device identifier and/or the device condition at block 406, and/or retrieving enhanced information including one or more communication links organized on one or more graphical images based on the device identifier and/or the device condition at block 408.

In some embodiments, the operation of retrieving enhanced information including one or more sounds based on the device identifier and/or the device condition at block 402 may be performed by a premises monitoring system 1004 as disclosed in FIG. 10. For example, in some embodiments, one or more premises monitoring systems 1004 may retrieve enhanced information including one or more sounds 1030 based on one or more device identifiers and/or one or more device conditions from one or more data sources 1006. Sounds 1030 may include voice instructions and or warning tones. As a specific example, in some embodiments, one or more premises monitoring systems 1004 may retrieve voice instructions supplementing one or more retrieved graphical images 1032/1034 and/or written information 1040 discussed herein. In some embodiments, one or more premises monitoring systems 1004 may retrieve enhanced information including one or more sounds 1030 based on one or more device identifiers and/or one or more device conditions from one or more data sources 1006 using input provided by one or more laptops 1008, tablets 1010, computers 1024, phones 1016, and/or personal digital assistants 1018 (e.g. a trapped individual at premises 1028 providing input regarding their situation or a first responder providing feedback on conditions at premises 1028 for subsequent responders).

In some embodiments, the operation of retrieving enhanced information including one or more sounds organized on one or more graphical images based on the device identifier and/or the device condition at block 404 may be performed by a premises monitoring system 1004 as disclosed in FIG. 10. For example, in some embodiments, one or more premises monitoring systems 1004 may retrieve enhanced information including one or more sounds 1030 organized on one or more graphical images 1032/1034 based on one or more device identifiers and/or one or more device conditions from one or more data sources 1006. Sounds organized on one or more graphical images may include an icon positioned relative to a graphical image, wherein selection of the icon results in the sound. As a further example, in some embodiments, one or more premises monitoring systems 1004 may retrieve a floor plan having an icon proximate to a security door, wherein selection of the icon results in audible instructions providing a passcode and an indication of how to proceed upon entrance of a particular area. In some embodiments, one or more premises monitoring systems 1004 may retrieve enhanced information including one or more sounds 1030 organized as a list or another arrangement based on one or more device identifiers and/or one or more device conditions from one or more data sources 1006.

In some embodiments, the operation of retrieving enhanced information including one or more communication links based on the device identifier and/or the device condition at block 406 may be performed by a premises monitoring system 1004 as disclosed in FIG. 10. For example, in some embodiments, one or more premises monitoring systems 1004 may retrieve enhanced information including one or more communication links 1038 based on one or more device identifiers and/or one or more device conditions from one or more data sources 1006. A communication link may include a phone number, an email account, an instant message account, an IP address, or the like. A communication link may include a link with a speaker, a phone, computer, or the like. As a specific example, in some embodiments, one or more premises monitoring systems 1004 may retrieve one or more communication links 1038 for a speaker in a room of premises 1028 from one or more data sources 1006. As another specific example, in some embodiments, one or more premises monitoring systems 1004 may retrieve one or more communication links 1038 for phone of an owner, manager, employee, occupant, customer, supplier, neighbor or the like associated with premises 1028 from one or more data sources 1006. In some embodiments, one or more premises monitoring systems 1004 may retrieve enhanced information including one or more communication links 1038 based on one or more device identifiers and/or one or more device conditions from one or more data sources 1006 using input provided by one or more laptops 1008, tablets 1010, computers 1024, phones 1016, and/or personal digital assistants 1018 (e.g. a trapped individual at premises 1028 providing her phone number).

In some embodiments, the operation of retrieving enhanced information including one or more communication links organized on one or more graphical images based on the device identifier and/or the device condition at block 408 may be performed by a premises monitoring system 1004 as disclosed in FIG. 10. For example, in some embodiments, one or more premises monitoring systems 1004 may retrieve enhanced information including one or more communication links 1038 organized on one or more graphical images 1032/1034 based on one or more device identifiers and/or one or more device conditions from one or more data sources 1006. Communication links organized on one or more graphical images may include an icon positioned relative to a graphical image, wherein selection of the icon results in establishing the communication link. As a further example, in some embodiments, one or more premises monitoring systems 1004 may retrieve a floor plan having an icon proximate to a room, wherein selection of the icon results in a communication link being established with a speaker in the room, such as to allow communication with occupants of the room. In some embodiments, one or more premises monitoring systems 1004 may retrieve enhanced information including one or more communication links 1038 organized as a list or another arrangement based on one or more device identifiers and/or one or more device conditions from one or more data sources 1006.

Figure 5:
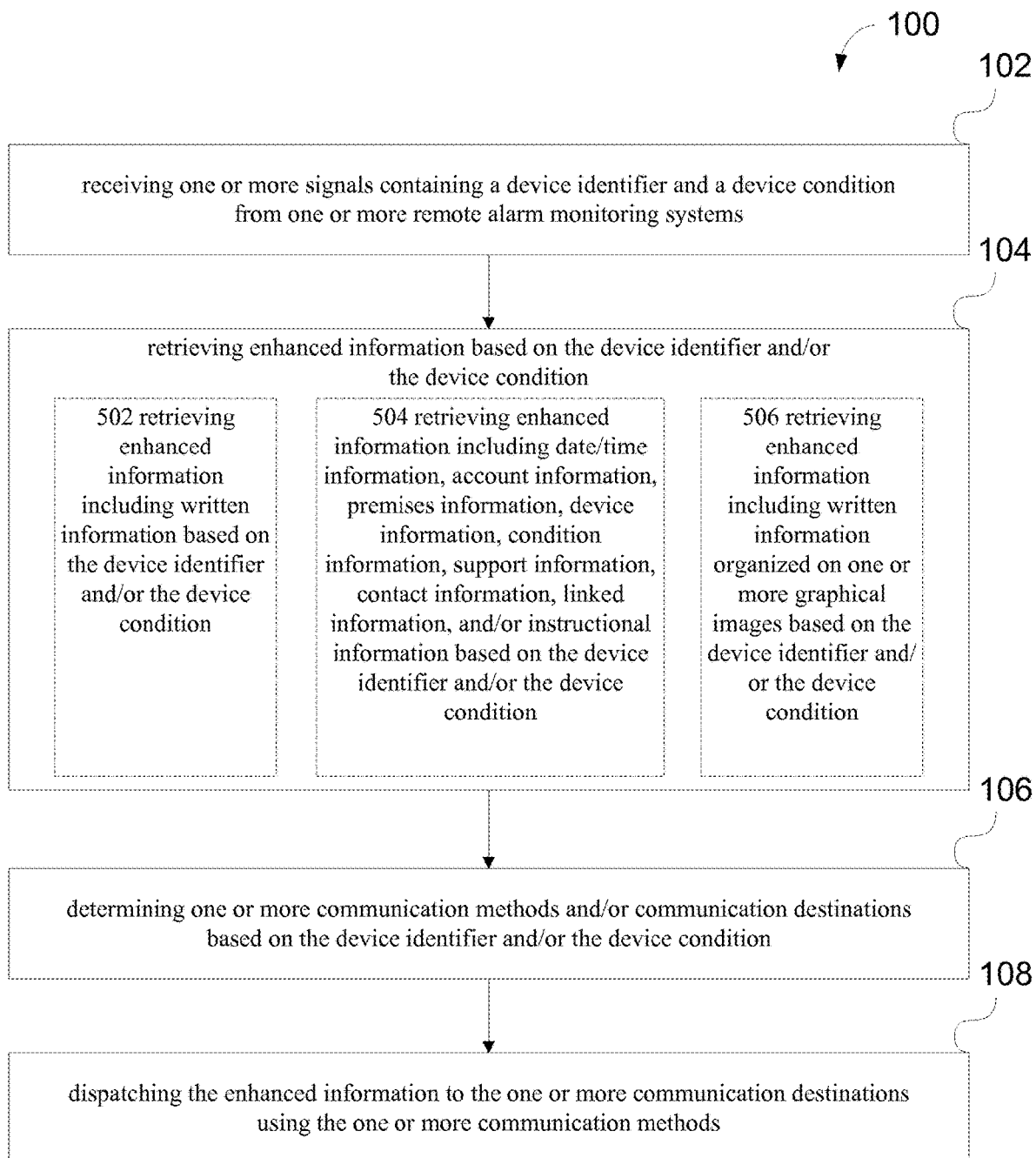

FIG. 5 is a block diagram of alternative embodiments of a method performed by a premises monitoring system, in accordance with embodiments of the invention. In some embodiments, method 100 may include operations of retrieving enhanced information including written information based on the device identifier and/or the device condition at block 502, retrieving enhanced information including date/time information, account information, premises information, device information, condition information, support information, contact information, linked information, and/or instructional information based on the device identifier and/or the device condition at block 504, and retrieving enhanced information including written information organized on one or more graphical images based on the device identifier and/or the device condition at block 506.

In some embodiments, the operation of retrieving enhanced information including written information based on the device identifier and/or the device condition at block 502 may be performed by a premises monitoring system 1004 as disclosed in FIG. 10. For example, in some embodiments, one or more premises monitoring systems 1004 may retrieve enhanced information including written information 1040 based on one or more device identifiers and/or one or more device conditions from one or more data sources 1006. In some embodiments, one or more premises monitoring systems 1004 may retrieve enhanced information including written information 1040 based on one or more device identifiers and/or one or more device conditions from one or more data sources 1006 using input provided by one or more laptops 1008, tablets 1010, computers 1024, phones 1016, and/or personal digital assistants 1018 (e.g. a first responder at premises 1028 may provide details as to steps taken and action items remaining). In some embodiments, one or more premises monitoring systems 1004 may retrieve enhanced information including written information 1040 based on one or more device identifiers and/or one or more device conditions from one or more sources other than one or more data sources 1006, such as from one or more laptops 1008, tablets 1010, computers 1024, phones 1016, and/or personal digital assistants 1018.

In some embodiments, the operation of retrieving enhanced information including date/time information, account information, premises information, device information, condition information, support information, contact information, linked information, and/or instructional information based on the device identifier and/or the device condition at block 504 may be performed by a premises monitoring system 1004 as disclosed in FIG. 10. For example, in some embodiments, one or more premises monitoring systems 1004 may retrieve enhanced information including date/time information, account information, premises information, device information, condition information, support information, contact information 1036, linked information, and/or instructional information based on one or more device identifiers and/or one or more device conditions from one or more data sources 1006. Date/time information may include a date/time of occurrence of device condition, transmission of device identifier and/or device condition, receipt of device identifier and/or device condition, transmission of enhanced information, receipt of enhanced information, actions taken, or the like. Account information may include an account identification, an address, a contact, a site location, or the like. Premises information may include a GPS coordinate, driving directions, a crossroad, a building description, an access description, a room description, site information, a password/passcode, a warning, a remote alarm monitoring system hardware position/model/connection point, a response procedure, an evacuation procedure, an emergency disaster plan, or the like. Device information may include device identifier, device type, device model, device position, device description, device encasement type, device connection type, or the like. Condition information may include device condition, explanation of nature of condition, or the like. Support information may include a real-time or previously captured record of actions taken and/or reported by others, report data, archival data, or the like. Contact information may include contact information for an authority, first responder, key holder, owner, manager, occupant, neighbor, customer, supplier, service company, or the like. Link information may include a URL, file attachment, or the like. Instructional information may include a message, note, or the like. As a specific example, in some embodiments, one or more premises monitoring systems 1004 may retrieve account address, driving directions, building description, access description, access passcode, room description, remote alarm monitoring system position/model/connection point, evacuation procedures, device position, device encasement type, explanation of nature of condition, real-time records of actions taken by others, owner contact information, service company contact information, and employee contact information based on one or more device identifiers and/or one or more device conditions from one or more data sources 1006.

In some embodiments, the operation of retrieving enhanced information including written information organized on one or more graphical images based on the device identifier and/or the device condition at block 506 may be performed by a premises monitoring system 1004 as disclosed in FIG. 10. For example, in some embodiments, one or more premises monitoring systems 1004 may retrieve enhanced information including written information 1040 organized on one or more graphical images 1032/1034 based on one or more device identifiers and/or one or more device conditions from one or more data sources 1006. Written information organized on one or more graphical images may include an icon positioned relative to a graphical image, wherein selection of the icon results in display of the written information. As a specific example, in some embodiments, one or more premises monitoring systems 1004 may retrieve a floor plan having an icon proximate to a room, wherein selection of the icon results in display of a room description. In some embodiments, one or more premises monitoring systems 1004 may retrieve enhanced information including written information 1040 organized as a list or another arrangement based on one or more device identifiers and/or one or more device conditions from one or more data source 1006.

Figure 6:
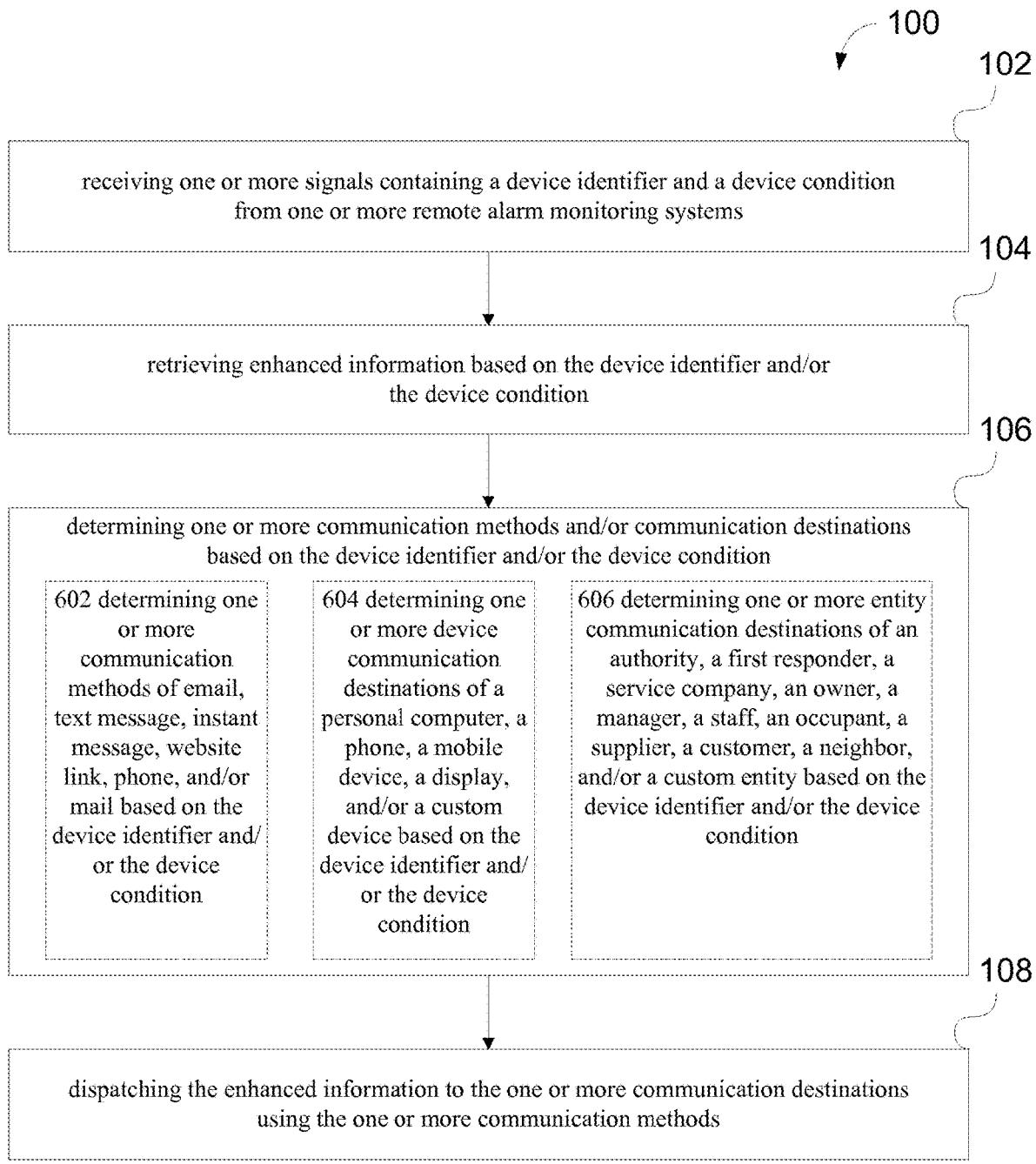

FIG. 6 is a block diagram of alternative embodiments of a method performed by a premises monitoring system, in accordance with embodiments of the invention. In some embodiments, method 100 may include operations of determining one or more communication methods of email, text message, instant message, website link, phone, and/or mail based on the device identifier and/or the device condition at block 602, determining one or more device communication destinations of a personal computer, a phone, a mobile device, a display, and/or a custom device based on the device identifier and/or the device condition at block 604, and determining one or more entity communication destinations of an authority, a first responder, a service company, an owner, a manager, a staff, an occupant, a supplier, a customer, a neighbor, and/or a custom entity based on the device identifier and/or the device condition at block 606.

In some embodiments, the operation of determining one or more communication methods of email, text message, instant message, website link, phone, and/or mail based on the device identifier and/or the device condition at block 602 may be performed by a premises monitoring system 1004 as disclosed in FIG. 10. For example, in some embodiments, one or more premises monitoring systems 1004 may determine one or more communication methods of email, text message, instant message, website link, phone, and/or mail based on one or more device identifiers and/or one or more device conditions from one or more data sources 1006. An email communication method may include sending enhanced information to one or more email accounts. A text message communication method may include sending enhanced information to one or more phone numbers. An instant message communication method may include sending enhanced information to one or more instant messenger accounts. A website link communication method may include establishing or updating a website to include enhanced information and sending a website link via email, text message, instant message, phone, and/or mail to facilitate access to the website. A phone communication method may include manually and/or automatically calling one or more phone numbers to deliver enhanced information. A mail based communication method may include sending enhanced information to one or more physical postal addresses. As a specific example, in some embodiments, one or more premises monitoring systems 1004 may determine a communication method of website link via text message and/or email based upon a device identifier for a smoke detector and a device condition of alarm from one or more data sources 1006. Alternatively, in some embodiments, one or more premises monitoring systems 1004 may determine a communication method of mail based upon a device identifier for a smoke detector and a device condition of normal from one or more data source 1006 (e.g. for sending a periodic postcard confirming normal operation). In some embodiments, one or more premises monitoring systems 1004 may determine a combination of communication methods based on one or more device identifiers and/or one or more device conditions from one or more data sources 1006. In some embodiments, one or more premises monitoring systems 1004 may determine one or more communication methods of email, text message, instant message, website link, phone, and/or mail based on one or more device identifiers and/or one or more device conditions from one or more data sources 1006 using input provided by one or more laptops 1008, tablets 1010, computers 1024, phones 1016, and/or personal digital assistants 1018 (e.g. a concerned friend or family member may text "status request" to the premises monitoring system 1004 and the premises monitoring system 1004 may determine a communication method of text message to the phone number of the family member). In some embodiments, one or more premises monitoring systems 1004 may determine one or more communication methods of email, text message, instant message, website link, phone, and/or mail based on one or more device identifiers and/or one or more device conditions from one or more sources other than one or more data sources 1006, such as from one or more laptops 1008, tablets 1010, computers 1024, phones 1016, and/or personal digital assistants 1018.

In some embodiments, the operation of determining one or more device communication destinations of a personal computer, a phone, a mobile device, a display, and/or a custom device based on the device identifier and/or the device condition at block 604 may be performed by a premises monitoring system 1004 as disclosed in FIG. 10. For example, in some embodiments, one or more premises monitoring systems 1004 may determine one or more device communication destinations of one or more personal computers 1014, phones 1016, mobile devices 1018 (e.g. PDA, pager, electronic book reader, or the like), displays 1020, tablets 1010, laptops 1008, mail boxes 1012, and/or custom devices (e.g. GOBOOK MR-1 by GENERAL DYNAMICS or the like) based on one or more device identifiers and/or one or more device conditions from one or more data sources 1006. A device communication destination of a personal computer may include sending enhanced information via email, text message, instant message, website link, phone, and/or mail to a personal computer. A device communication destination of a phone may include sending enhanced information via email, text message, instant message, website link, phone, and/or mail to a phone. A device communication destination of a mobile device may include sending enhanced information via email, text message, instant message, website link, phone, and/or mail to a mobile device. A device communication destination of a display may include sending enhanced information via email, text message, instant message, website link, phone, and/or mail to a display. A device communication destination of a tablet may include sending enhanced information via email, text message, instant message, website link, phone, and/or mail to a tablet. A device communication destination of a laptop may include sending enhanced information via email, text message, instant message, website link, phone, and/or mail to a laptop. A device communication destination of mail box may include sending enhanced information via email, text message, instant message, website link, phone, and/or mail to a postal address. A device communication destination of a custom device may include sending enhanced information via email, text message, instant message, website link, phone, and/or mail to a custom device. As a specific example, in some embodiments, one or more premises monitoring systems 1004 may determine a device communication destination of a display 1020 (e.g. a wall mounted television screen or the like) at premises 1028 based on a device identifier for a smoke detector and a device condition of alarm from one or more data sources 1006. Alternatively, in some embodiments, one or more premises monitoring systems 1004 may determine a device communication destination of a personal computer 1014 at premises 1028 based on a device identifier for a smoke detector and a device condition of alarm from one or more data source 1006. In some embodiments, one or more premises monitoring systems 1004 may determine a combination of device communication destinations based on one or more device identifiers and/or one or more device conditions from a data source 1006. In some embodiments, one or more premises monitoring systems 1004 may determine one or more device communication destinations of one or more personal computers 1014, phones 1016, mobile devices 1018 (e.g. PDA, pager, electronic book reader, or the like), displays 1020, tablets 1010, laptops 1008, mail boxes 1012, and/or custom devices (e.g. GOBOOK MR-1 by GENERAL DYNAMICS or the like) based on one or more device identifiers and/or one or more device conditions from one or more data sources 1006 using input provided by one or more laptops 1008, tablets 1010, computers 1024, phones 1016, and/or personal digital assistants 1018 (e.g. a first responder may provide device communication destinations for associates/co-workers). In some embodiments, one or more premises monitoring systems 1004 may determine one or more device communication destinations of one or more personal computers 1014, phones 1016, mobile devices 1018 (e.g. PDA, pager, electronic book reader, or the like), displays 1020, tablets 1010, laptops 1008, mail boxes 1012, and/or custom devices (e.g. GOBOOK MR-1 by GENERAL DYNAMICS or the like) based on one or more device identifiers and/or one or more device conditions from one or more sources other than one or more data sources 1006, such as from one or more laptops 1008, tablets 1010, computers 1024, phones 1016, and/or personal digital assistants 1018.

In some embodiments, the operation of determining one or more entity communication destinations of an authority, a first responder, a service company, an owner, a manager, a staff, an occupant, a supplier, a customer, a neighbor, and/or a custom entity based on the device identifier and/or the device condition at block 606 may be performed by a premises monitoring system 1004 as disclosed in FIG. 10. For example, in some embodiments, one or more premises monitoring systems 1004 may determine one or more entity communication destinations of an authority, first responder, service company, owner, manager, staff, occupant, supplier, customer, neighbor, and/or custom entity based on one or more device identifiers and/or one or more device conditions from one or more data sources 1006. An authority entity communication destination may include one or more police officers, security officers, government employees and/or officials, or the like. A first responder entity communication destination may include one or more emergency personnel, fire personnel, medical personnel, or the like. A service company entity communication destination may include one or more employees of a water company, a gas company, an electric company, or the like. An owner entity communication destination may include one or more owners of a premises, owners of a business of a premises, owners of a neighboring premises, owners of a business of a neighboring premises, or the like. A manager entity communication destination may include one or more managers of a premises, managers of a business of a premises, managers of a neighboring premises, managers of a business of a neighboring premises, or the like. A staff entity communication destination may include one or more staff of a business of a premises, staff of a business of a neighboring premises, or the like. An occupant entity communication destination may include one or more occupants of a premises, occupants of a neighboring premises, or the like. A supplier entity communication destination may include one or more suppliers of a business of a premises, suppliers of a business of a neighboring premises, or the like. A customer entity communication destination may include one or more customers of a business of a premises, customers of a business of a neighboring premises, or the like. A neighbor entity communication destination may include one or more neighbors of a premises, such as an upstairs, downstairs, or lateral neighbor. A custom entity communication destination may include any defined individuals or groups. As a specific example, in some embodiments, one or more premises monitoring systems 1004 may determine entity communication destinations of police officers, medical personnel, gas company, owner of a business at a premises, staff of the business, occupants of the premises, owner of a neighboring business at the premises, and staff of the neighboring business based on a device identifier fora smoke detector and a device condition of alarm from one or more data sources 1006. In some embodiments, one or more premises monitoring systems 1004 may determine a combination of entity communication destinations based on one or more device identifiers and/or one or more device conditions from one or more data sources 1006. In some embodiments, one or more premises monitoring systems 1004 may determine one or more entity communication destinations of one or more authorities, first responders, service companies, owners, managers, staff, occupants, suppliers, customers, neighbors, and/or custom entities based on one or more device identifiers and/or one or more device conditions from one or more data sources 1006 using input provided by one or more laptops 1008, tablets 1010, computers 1024, phones 1016, personal digital assistants 1018 (e.g. a first responder may provide entity communication destinations of associates/co-workers). In some embodiments, one or more premises monitoring systems 1004 may determine one or more entity communication destinations of one or more authorities, first responders, service companies, owners, managers, staff, occupants, suppliers, customers, neighbors, and/or custom entities based on one or more device identifiers and/or one or more device conditions from one or more sources other than one or more data sources 1006, such as from one or more laptops 1008, tablets 1010, computers 1024, phones 1016, and/or personal digital assistants 1018.

Figure 7:
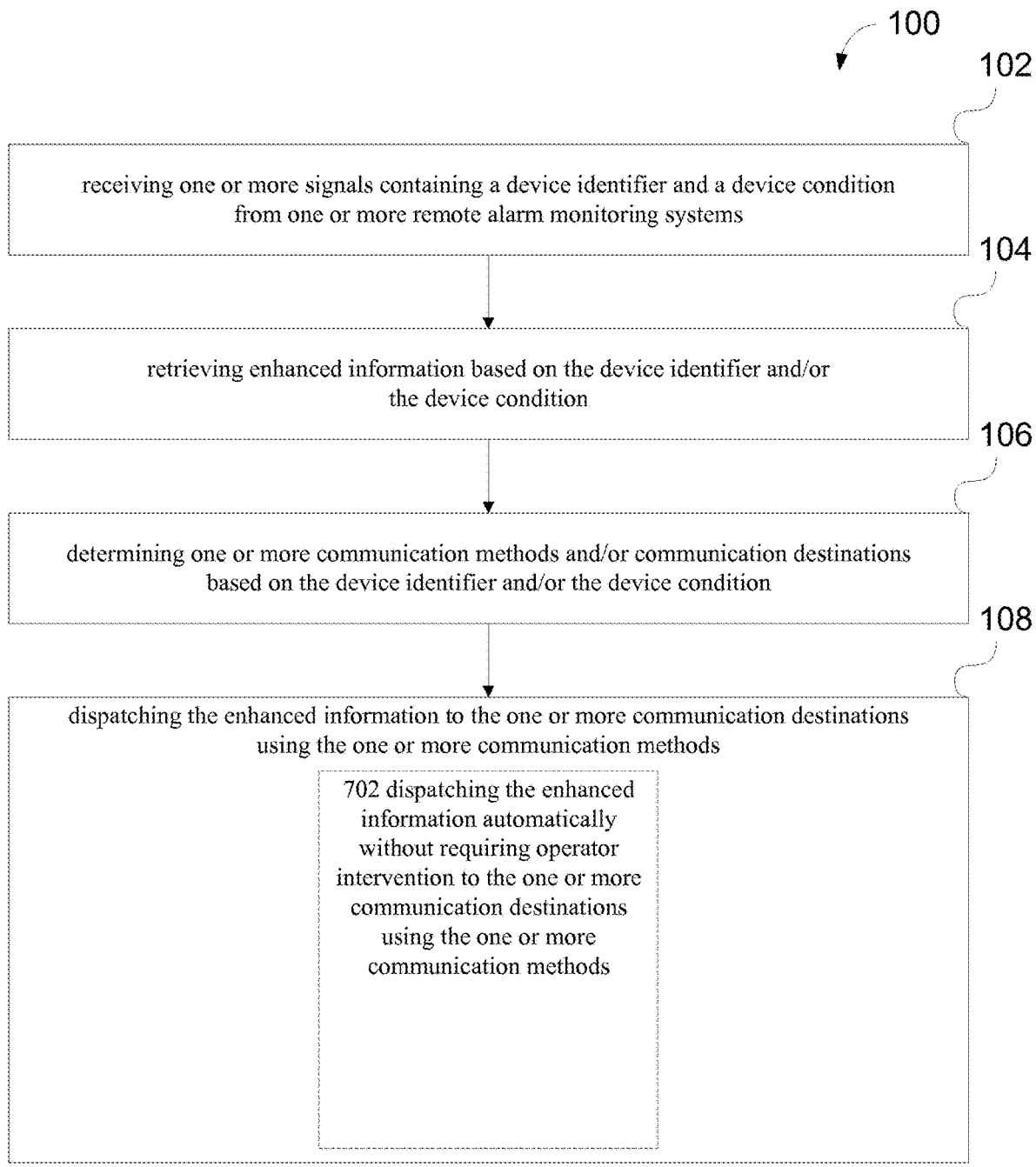

FIG. 7 is a block diagram of alternative embodiments of a method performed by a premises monitoring system, in accordance with embodiments of the invention. In some embodiments, method 100 may include an operation of dispatching the enhanced information automatically without requiring operator intervention to the one or more communication destinations using the one or more communication methods at block 702.

In some embodiments, the operation of dispatching the enhanced information automatically without requiring operator intervention to the one or more communication destinations using the one or more communication methods at block 702 may be performed by a premises monitoring system 1004 as disclosed in FIG. 10. For example, in some embodiments, one or more premises monitoring systems 1004 may dispatch enhanced information automatically without requiring operator intervention to one or more displays 1020, personal digital assistants 1018, phones 1016, computers 1014, mail boxes 1012, tablets 1010, and/or laptops 1008 using one or more communication methods of email, text message, instant message, website link, phone, and/or mail. Dispatching the enhanced information automatically without requiring operator intervention may include no operator review or operator review prior to, during, or after dispatch. As a specific example, in some embodiments, one or more premises monitoring systems 1004 may dispatch enhanced information substantially immediately (e.g. within a few seconds) upon receipt of one or more signals containing one or more device identifiers and/or one or more device conditions without delay caused from manual review. In some embodiments, one or more premises monitoring systems 1004 may triage dispatch of enhanced information automatically without requiring operator intervention to one or more communication destinations using one or more communication methods (e.g. dispatching most critical enhanced information first, dispatching to first responders first, or the like). In some embodiments, one or more premises monitoring systems 1004 may queue dispatch of enhanced information automatically without requiring operator intervention to one or more communication destinations using one or more communication methods. In some embodiments, one or more premises monitoring systems 1004 may batch dispatch of enhanced information automatically without requiring operator intervention to one or more communication destinations using one or more communication methods. In some embodiments, one or more premises monitoring systems 1004 may dispatch enhanced information automatically without requiring operator intervention to a plurality of communication destinations and/or using a plurality of communication methods (e.g. cascade or simultaneous dispatch). In some embodiments, one or more premises monitoring systems 1004 may dispatch enhanced information and/or an error message automatically without requiring operator intervention to one or more backup communication destinations and/or using one or more backup communication methods in an event of delivery failure. In some embodiments, one or more premises monitoring systems 1004 may dispatch enhanced information automatically without requiring operator intervention to one or more communication destinations using one or more communication methods to permit displaying, editing, printing, sharing, saving, or the like with respect to the enhanced information. In some embodiments, one or more premises monitoring systems 1004 may dispatch enhanced information automatically without requiring operator intervention from one or more premise monitoring systems 1004 to one or more communication destinations using one or more communication methods. In some embodiments, one or more premises monitoring system 1004 may cause dispatch of enhanced information automatically without requiring operator intervention from one or more sources other than one or more premise monitoring systems 1004 to one or more communication destinations using one or more communication methods (e.g. from a camera of premises 1028, from another premises monitoring system, from a personal computer 1014, or the like). In some embodiments, one or more premises monitoring systems 1004 may provide local notification prior to, during, or after dispatch of enhanced information. For example, in some embodiments, one or more premises monitoring systems 1004 may provide local notification including one or more pending signals, dispatched signals, and/or one or more resolved signals. In some embodiments, one or more premises monitoring systems 1004 may provide local notification including one or more device identifiers and/or one or more device conditions. In some embodiments, one or more premises monitoring systems 1004 may provide local notification including one or more audible alerts, displayed messages, and/or printed messages. In some embodiments, one or more premises monitoring systems 1004 may provide local notification providing for managing, acknowledging, dispatching, and/or resolving one or more signals.

In some embodiments, method 100 may include an operation of archiving. In some embodiments, the operation of archiving may be performed by a premises monitoring system 1004 as disclosed in FIG. 10. For example, in some embodiments, one or more premises monitoring systems 1004 may archive one or more dispatch date and times, dispatch methods, dispatch destinations, acknowledgements, resolutions, device identifiers, device conditions, communication failures, clock setting changes, clock failures, user edits, user access, user access attempts, printer failures, or the like.

Figure 8:
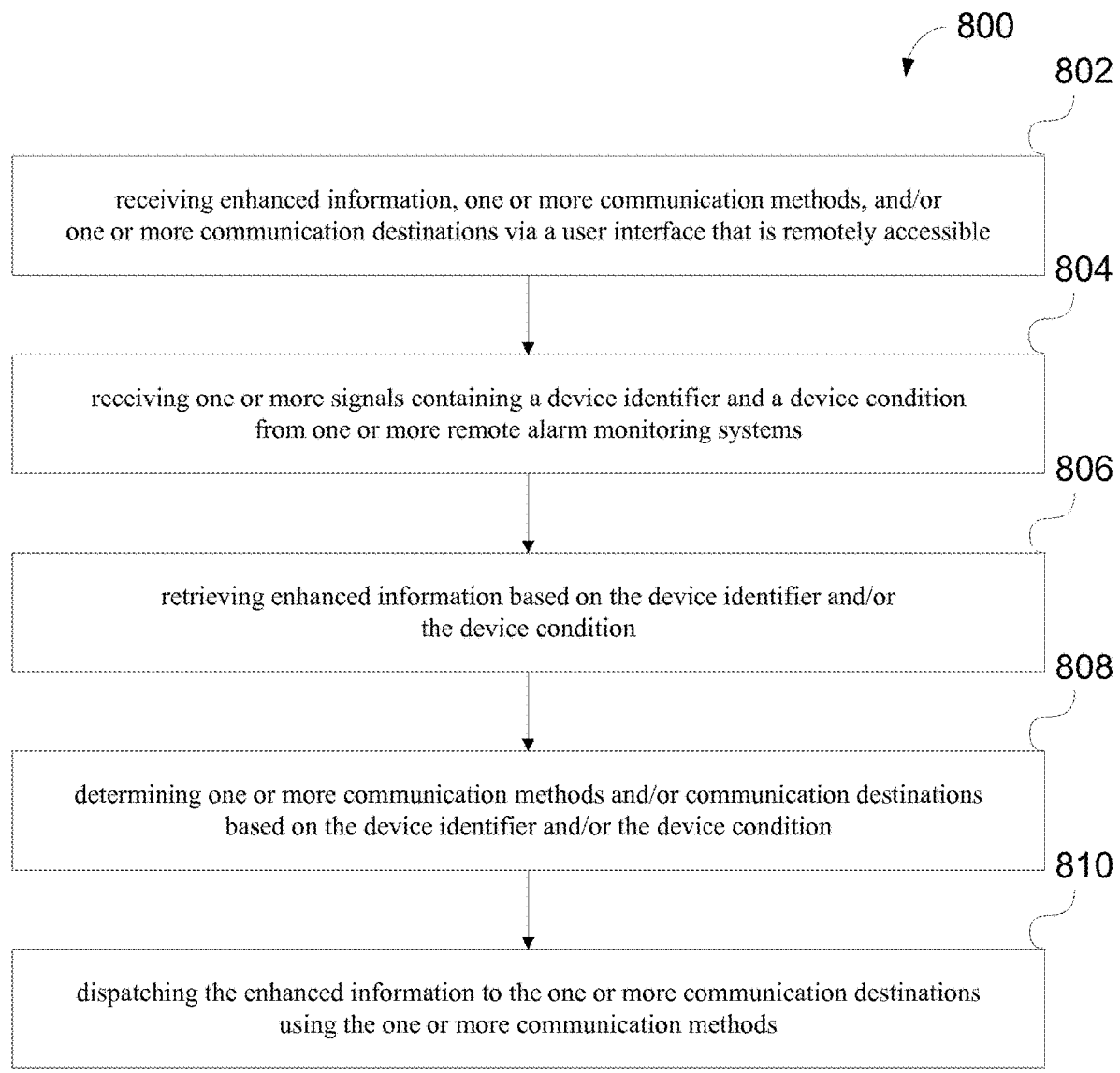
FIG. 8 is a block diagram of a method performed by a premises monitoring system, in accordance with an embodiment of the invention.

FIG. 8 is a block diagram of a method performed by a premises monitoring system, in accordance with an embodiment of the invention. In some embodiments, method 800 may include operations of receiving enhanced information, one or more communication methods, and/or one or more communication destinations via a user interface that is remotely accessible at block 802, receiving one or more signals containing a device identifier and a device condition from one or more remote alarm monitoring systems at block 804; retrieving enhanced information based on the device identifier and/or the device condition at block 806; determining one or more communication methods and/or communication destinations based on the device identifier and/or the device condition at block 808; and dispatching the enhanced information to the one or more communication destinations using the one or more communication methods at block 810.

In some embodiments, method 800 may be performed by one or more premises monitoring systems 1004 as disclosed in FIG. 10 and with reference to various embodiments discussed herein. In some embodiments, the operation of receiving enhanced information, one or more communication methods, and/or one or more communication destinations via a user interface that is remotely accessible at block 802 may be performed by a premises monitoring system 1004 as disclosed in FIG. 10. For example, in some embodiments, one or more premises monitoring systems 1004 may receive one or more graphical images 1032/1034 from a laptop 1008. As an additional example, in some embodiments, one or more premises monitoring systems 1004 may receive a communication message of text message and/or a communication destination from a phone 1016. Receiving enhanced information, one or more communication methods, and/or one or more communication destinations may occur as preparation for an emergency (e.g. uploading site plans, contact information, personnel photos, or the like), during an emergency (e.g. updating existing enhanced information with notes on blocked entrances, pictures of collapsed or unstable structures, notes on people missing, or the like), or after an emergency (e.g. documenting efforts, outcomes, evidence, or the like). In some embodiments, one or more premises monitoring systems 1004 may receive account information via one or more user interfaces that are remotely accessible. In some embodiments, one or more premises monitoring systems 1004 may receive customized enhanced information via one or more user interfaces that are remotely accessible. Customized enhanced information may replace and/or supplement default enhanced information. Customized enhanced information may be received using one or more templates. In some embodiments, one or more premises monitoring systems 1004 may receive one or more defined device identifiers and/or one or more defined device conditions via one or more user interfaces that are remotely accessible. In some embodiments, one or more premises monitoring systems 1004 may receive enhanced information including one or more graphical images 1032/1034, one or more sounds 1030, one or more communication links 1038, and/or written information 1040 via one or more user interfaces that are remotely accessible. In some embodiments, one or more premises monitoring systems 1004 may receive one or more associations of one or more indicators, sounds 1030, communication links 1038, and/or written information 1040 with one or more graphical images 1032/1034 via one or more user interfaces that are remotely accessible. In some embodiments, one or more premises monitoring systems 1004 may receive one or more associations of one or more indicators, graphical images 1032/1034, sounds 1030, communication links 1038, and/or written information 1040 with one or more device identifiers and/or one or more device conditions via one or more user interfaces that are remotely accessible. In some embodiments, one or more premises monitoring systems 1004 may receive one or more hierarchical associations of one or more graphical images 1032/1034 with one or more other graphical images 1032/1034 via one or more user interfaces that are remotely accessible. In some embodiments, one or more premises monitoring systems 1004 may receive input relating to enabling and/or disenabling one or more features of the one or more premises monitoring system 1004 via one or more user interfaces that are remotely accessible. In some embodiments, one or more premises monitoring systems 1004 may provide for one or more management tools, such as for account setup, account management, monitor of user access, dispatch review, acknowledgement, resolution, and/or the like, via one or more user interfaces that are remotely accessible. In some embodiments, one or more premises monitoring systems 1004 may provide archival data and/or report access via one or more user interfaces that are remotely accessible. In some embodiments, one or more premises monitoring systems 1004 may receive or provide data via one or more user interfaces that are locally accessible.

Figure 9:
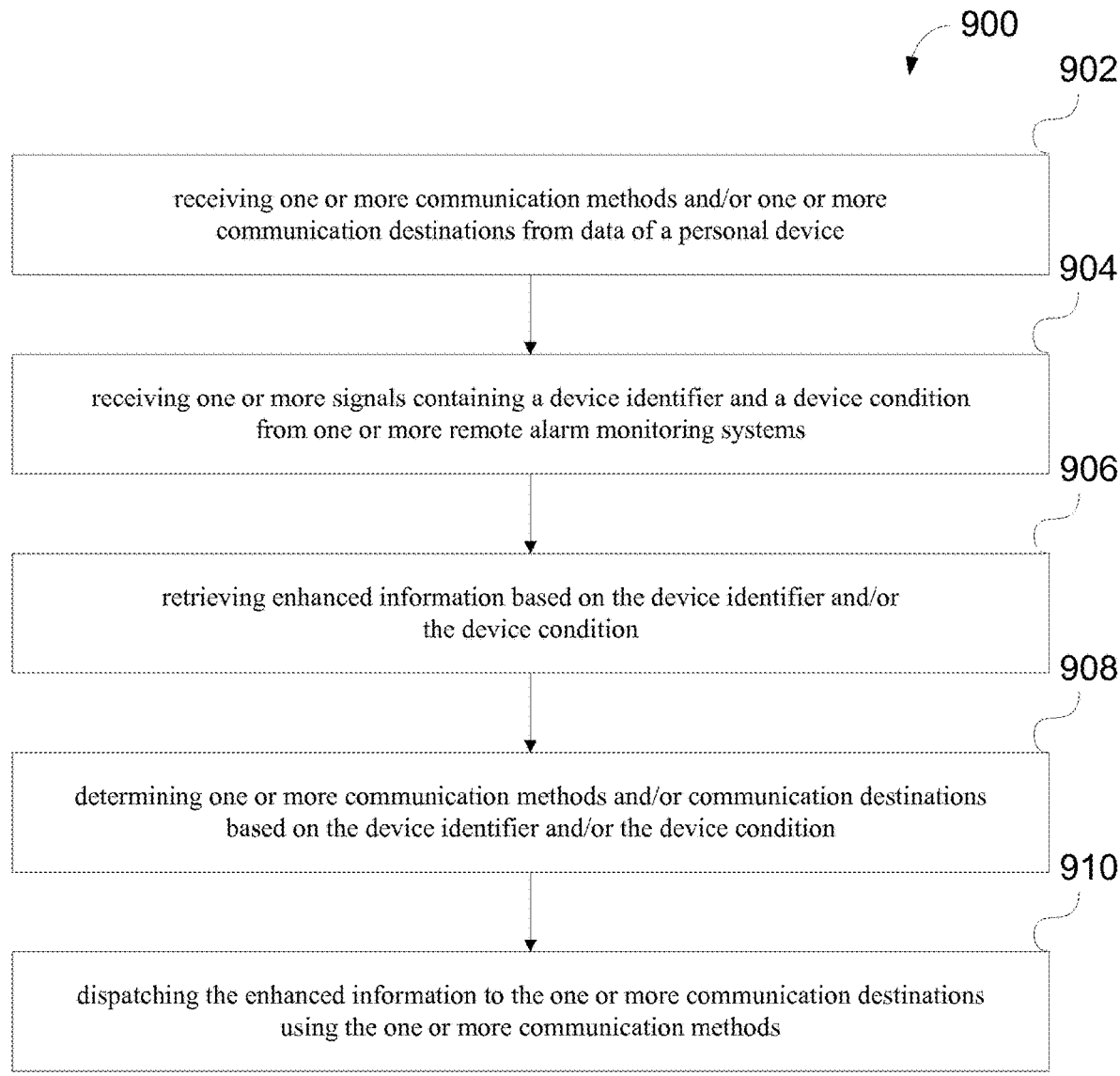
FIG. 9 is a block diagram of a method performed by a premises monitoring system, in accordance with an embodiment of the invention.

FIG. 9 is a block diagram of a method performed by a premises monitoring system, in accordance with an embodiment of the invention. In some embodiments, method 900 may include operations of receiving one or more communication methods and/or one or more communication destinations from data of a personal device at block 902, receiving one or more signals containing a device identifier and a device condition from one or more remote alarm monitoring systems at block 904; retrieving enhanced information based on the device identifier and/or the device condition at block 906; determining one or more communication methods and/or communication destinations based on the device identifier and/or the device condition at block 908; and dispatching the enhanced information to the one or more communication destinations using the one or more communication methods at block 910.

In some embodiments, method 900 may be performed by one or more premises monitoring systems 1004 as disclosed in FIG. 10 and with reference to various embodiments discussed herein. In some embodiments, the operation of receiving one or more communication methods and/or one or more communication destinations from data of a personal device at block 902 may be performed by a premises monitoring system 1004 as disclosed in FIG. 10. For example, in some embodiments, one or more premises monitoring systems 1004 may receive one or more communication methods and/or one or more communication destinations from data of one or more personal devices. A personal device may include a smart card, RFID device, or the like configurable to communicating and/or otherwise indicating one or more communication methods and/or one or more communication destinations. As a specific example, in some embodiments, one or more premises monitoring systems 1004 may receive an email communication method and an email account communication destination automatically from a smart card of a customer as the customer enters a shopping mall, which email account corresponds to an email account accessible on a personal digital assistant of the customer. Thereafter, the one or more premises monitoring systems 1004 may use the email communication method and the email account communication destination provided from the smart card to dispatch enhanced information to the customer in the event of an emergency while the customer is in the shopping mall. As a further example, in some embodiments, one or more premises monitoring systems 1004 may receive a phone communication method and a phone number communication destination automatically from an RFID tag of a customer as the customer checks into a hotel, which phone number corresponds to a phone of the customer. Thereafter, the one or more premises monitoring systems 1004 may use the phone communication method and the phone number communication destination provided from the RFID tag to dispatch enhanced information to the customer in the event of an emergency while the customer is staying at the hotel. In some embodiments, one or more premises monitoring systems 1004 may be programmed to purge one or more communication methods and/or communication destinations received in such a manner periodically for privacy concerns. In some embodiments, one or more premises monitoring systems 1004 may receive one or more communication methods and/or one or more communication destinations by receiving an identifier from of a personal device and correlating the identifier with one or more communication methods and/or one or more communication destinations. The correlation of one or more communication methods and/or one or more communication destinations with an identifier may be managed via one or more user interfaces. In some embodiments, one or more premises monitoring systems 1004 may receive a communication method and/or a communication destination from data of a personal device, wherein the communication destination is a proxy communication destination that conceals the actual communication destination (e.g. a secure server may handle translations of proxy communication destinations to actual communication destinations to retain actual communication destinations in privacy). The correlation of one or more proxy communication destinations to one or more actual communication destinations may be managed via one or more user interfaces. In some embodiments, one or more premises monitoring systems 1004 may receive one or more communication methods and/or one or more communication destinations from data of one or more personal devices and/or one or more positions, which may be periodically updatable (e.g. to enable dispatch of position specific enhanced information). In some embodiments, one or more premises monitoring systems 1004 may receive one or more communication methods and/or one or more communication destinations from input via one or more kiosks.

FIG. 10 is a diagram of a system for implementing a premises monitoring system, in accordance with an embodiment of the invention. In some embodiments, system 1000 may include a premises 1028 associated with one or more pull stations 1022, one or more security devices 1024, one or more smoke detectors 1026, and/or one or more remote alarm monitoring systems 1002; one or more premises monitoring systems 1004 operably communicating with one or more data sources 1006 including one or more sounds 1030, one or more raster graphical images 1032, one or more vector graphical images 1034, one or more communication links 1038, written information 1040, one or more cameras/videos 1038, and/or one or more contacts 1036; and/or one or more displays 1020, one or more personal digital assistants 1018, one or more phones 1016, one or more computers 1014, one or more mail boxes 1012, one or more tablets 1010, and/or one or more laptops 1008. In some embodiments, system 1000 may include fewer, greater, or different components.

In some embodiments, one or more premises 1028 may include a plurality of remote alarm monitoring systems 1002. In some embodiments, one or more premises 1028 may include fewer, greater, or different alarm or monitoring devices. In some embodiments, one or more remote alarm monitoring systems 1002 may be located remotely to one or more premises 1028. In some embodiments, one or more premises monitoring systems 1004 may be disposed locally and/or remotely from one or more premises 1028. In some embodiments, one or more premises monitoring systems 1004 may be associated with a plurality of remote alarm monitoring systems 1002 and/or a plurality of premises 1028. In some embodiments, one or more data stores 1006 may be local and/or remote from one or more premises monitoring systems 1004. In some embodiments, one or more data stores 1006 may be distributed. In some embodiments, one or more premises monitoring systems 1004 may be configured to dispatch and/or receive communications from one or more displays 1020, personal digital assistants 1018, phones 1016, computers 1014, mail boxes 1012, tablets 1010, and/or laptops 1008.

In some embodiments, one or more premises 1028 may include any residential, commercial, industrial, marina, transportation, indoor, outdoor, mixed-use, or other similar premises. In some embodiments, one or more remote alarm monitoring systems 1002 may include a Digital Alarm Communicator Transmitter (DACT), a RADSCAN ALARMNET 7810, a LARSNET RCI3300 AND RCI4000, a KELTRON RF7300—AES Intellinet receiver, or the like. In some embodiments, one or more remote alarm monitoring systems 1002 may be configured to communicate using formats including (1) SESCOA, VERTEX, DCI, FRANKLIN FAST—3X1, (2) SESCOA—4×3, (3) RADIONICS HEX—3×1, MODEM IIIa2 and BFSK, (4) Old ADEMCO, SILENT KNIGHT SLOW—3×1, (5) ACRON—4×1, (6) SILENT KNIGHT, NAPCO—4×2, (7) CFSK, VFSK, SIA—MODEM, (8) FBI SUPERFAST, SUR-GARD, ADEMCO HI-SPEED, (9) ADEMCO EXPRESS and ADEMCO CONTACT-ID—DTMF, or the like. In some embodiments, one or more remote alarm monitoring systems 1002 may be configured to communicate using reverse polarity, end-of-line resistors, dry contacts, proprietary tone signals, private lines, digital dialers, direct connects (e.g., POTS or fiber), star multiplex, distributed multiplex, coded signals, analog telephone lines, wireless communication, internet communication, ethernet communication, or the like. In some embodiments, one or more premises monitoring systems 1004 may be configured to receive one or more signals in series or in parallel from one or more remote alarm monitoring systems 1002. In some embodiments, one or more premises monitoring systems 1004 may be configured to include a swinger suppression operation to filter swinger signals toggling between normal and abnormal states to a manageable number (e.g. allowing a first occurrence, a most recent occurrence, and tracking a number of signals). In some embodiments, one or more premises monitoring systems 1004 may be configured to include operations of signal suppression, signal ignore, signal filter, and/or signal auto-acknowledge, which may be based upon a device identifier, a device condition, a period of time, weather severity, account, or the like. In some embodiments, one or more premises monitoring systems 1004 may be configured to include an operation of signal communication error detection. In some embodiments, one or more premises monitoring systems 1004 may include one or more redundancies, such as for backup and/or load balancing. In some embodiments, one or more premises monitoring systems 1004 may include one or more redundancies with automatic updates between redundant components. In some embodiments, one or more premises monitoring systems 1004 may include one or more dedicated components, such as for receiving signals for certain device types and/or device conditions.

In some embodiments, any embodiments discussed herein may be embodied in computer readable storage media and/or computer readable signals.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A non-volatile and non-transient computer-readable medium comprising machine-executable code comprising:
   code receiving one or more signals containing a device identifier and a device condition from one or more remote alarm monitoring systems;
   code retrieving enhanced information based on the device identifier and the device condition; and
   code dispatching the enhanced information to at least one communication destination using a communication method to be displayed graphically to a user of the communication method via a graphical user interface; and
   wherein the retrieving enhanced information based on the device identifier and the device condition comprises retrieving images comprising vector-based graphical images; and
   wherein the code retrieving enhanced information based on the device identifier and the device condition comprises code retrieving enhanced information including one or more videos based on the device identifier and the device condition, code retrieving enhanced information including one or more images organized in one or more hierarchically organized graphical images based on the device identifier and the device condition, and code retrieving enhanced information including one or more images organized in one or more superimposed visual indicators based on the device identifier and the device condition.

2. The medium of claim 1, wherein the code receiving one or more signals containing a device identifier and a device condition from one or more remote alarm monitoring systems comprises code receiving one or more signals containing a device identifier for a smoke detector, a pull station, a security detector, a carbon monoxide detector, and a check-in monitor from one or more remote alarm monitoring systems.

3. The medium of claim 1, wherein the code receiving one or more signals containing a device identifier and a device condition from one or more remote alarm monitoring systems comprises code receiving one or more signals containing a device condition of normal, fault, and supervisory from one or more remote alarm monitoring systems.

4. The medium of claim 1, wherein the code retrieving enhanced information based on the device identifier and the device condition comprises code retrieving enhanced information including one or more communication links based on the device identifier and the device condition.

5. The medium of claim 4, wherein the code retrieving enhanced information including one or more communication links based on the device identifier and the device condition comprises code retrieving enhanced information including one or more communication links organized on one or more graphical images based on the device identifier and the device condition.

6. The medium of claim 1, wherein the code retrieving enhanced information based on the device identifier and the device condition comprises code retrieving enhanced information including written information based on the device identifier and the device condition.

7. The medium of claim 6, wherein the code retrieving enhanced information including written information based on the device identifier and the device condition comprises code retrieving enhanced information including date/time information, account information, premises information, device information, condition information, support information, contact information, linked information, and instructional information based on the device identifier and the device condition.

8. The medium of claim 6, wherein the code retrieving enhanced information including written information based on the device identifier and the device condition comprises code retrieving enhanced information including written information organized on one or more graphical images based on the device identifier and the device condition.

9. A method for premises monitoring, comprising:
   providing a central monitoring system including machine-executable code embodied on a non-transient computer-readable medium, said code specially adapting the central monitoring system to receive one or more signals containing a device identifier and a device condition from one or more remote alarm monitoring systems; retrieve enhanced information based on the device identifier and the device condition; and dispatch the enhanced information to at least one communication destination using a communication method to be displayed graphically to a user of the communication method via a graphical user interface, wherein the retrieving enhanced information based on the device identifier and the device condition comprises retrieving images comprising at least one of vector-based graphical images, superimposed visual indicators, and hierarchically organized graphical images;
   receiving one or more signals containing a device identifier and a device condition from one or more remote alarm monitoring systems;
   retrieving enhanced information based on the device identifier and the device condition; and
   dispatching the enhanced information to at least one communication destination using a communication method; and
   wherein retrieving enhanced information based on the device identifier and the device condition comprises retrieving enhanced information including one or more videos based on the device identifier and the device condition, retrieving enhanced information including one or more images organized in one or more hierarchically organized graphical images based on the device identifier and the device condition, and retrieving enhanced information including one or more images organized in one or more superimposed visual indicators based on the device identifier and the device condition.

10. The method of claim 9, wherein the code determining one or more communication methods and communication destinations based on the device identifier and the device condition comprises code determining one or more communication methods of email, text message, instant message, website link, phone, and mail based on the device identifier and the device condition.

11. The method of claim 9, wherein the code determining one or more communication methods and communication destinations based on the device identifier and the device condition comprises code determining one or more device communication destinations of a personal computer, a phone, a mobile device, a display, and a custom device based on the device identifier and the device condition.

12. The method of claim 9, wherein the code determining one or more communication methods and communication destinations based on the device identifier and the device condition comprises code determining one or more entity communication destinations of an authority, a first responder, a service company, an owner, a manager, a staff, an occupant, a supplier, a customer, a neighbor, and a custom entity based on the device identifier and the device condition.

13. The method of claim 9, wherein the code dispatching the enhanced information to the one or more communication destinations using the one or more communication methods comprises code dispatching the enhanced information automatically without requiring operator intervention to the one or more communication destinations using the one or more communication methods.

14. The method of claim 9, further comprising code receiving enhanced information, code providing one or more communication methods, and code providing one or more communication destinations via a user interface that is remotely accessible.

15. The method of claim 9, further comprising code providing one or more communication methods and one or more communication destinations from data of a personal device.

16. A computerized system comprising a central monitoring system including machine-executable code embodied on a non-transient computer-readable medium, said code specially adapting the central monitoring system for receiving one or more signals containing a device identifier and a device condition from one or more remote alarm monitoring systems, retrieving enhanced information based on the device identifier and the device condition, determining one or more communication methods and communication destinations based on the device identifier and the device condition, and dispatching the enhanced information to the one or more communication destinations using the one or more communication methods to be displayed graphically to a user of the one or more communication methods via a graphical user interface, wherein the enhanced information based on the device identifier and the device condition comprises images comprising members selected from at least one of superimposed visual indicators, hierarchically organized graphical images, and vector-based graphical images, and wherein retrieving enhanced information based on the device identifier and the device condition comprises retrieving enhanced information including one or more videos based on the device identifier and the device condition, retrieving enhanced information including one or more images organized in one or more hierarchically organized graphical images based on the device identifier and the device condition, and retrieving enhanced information including one or more images organized in one or more superimposed visual indicators based on the device identifier and the device condition.

17. The system of claim 16, wherein the code receiving one or more signals containing a device identifier and a device condition from one or more remote alarm monitoring systems comprises code receiving one or more signals containing a device identifier for a smoke detector, a pull station, a security detector, a carbon monoxide detector, and a check-in monitor from one or more remote alarm monitoring systems.

18. The system of claim 16, wherein the code determining one or more communication methods and communication destinations based on the device identifier and the device condition comprises code determining one or more device communication destinations of a personal computer, a phone, a mobile device, a display, and a custom device based on the device identifier and the device condition.

19. The system of claim 16, wherein the code determining one or more communication methods and communication destinations based on the device identifier and the device condition comprises code determining one or more entity communication destinations of an authority, a first responder, a service company, an owner, a manager, a staff, an occupant, a supplier, a customer, a neighbor, and a custom entity based on the device identifier and the device condition.

* * * * *